(12) United States Patent
Griffiths (10) Patent No.: US 6,948,587 B2
(45) Date of Patent: Sep. 27, 2005

(54) PORTABLE ELEVATED PLATFORM (76) Inventor: Donne Griffiths, 19900 Cordill La., Spicewood, TX (US) 78669

( * ) Notice: Subject to any disclaimer, the term of this patent is extended or adjusted under 35 U.S.C. 154(b) by 0 days.

(21) Appl. No.: 10/639,028

(22) Filed: Aug. 12, 2003

(65) Prior Publication Data

US 2005/0034921 A1 Feb. 17, 2005

(51) Int. Cl.$^7$ .............................. E04G 1/00; E06C 7/16
(52) U.S. Cl. ........................................ 182/20; 182/116
(58) Field of Search ................................ 182/187, 188, 182/135, 136, 20, 116, 141; 108/152; 297/217.7

(56) References Cited

U.S. PATENT DOCUMENTS

| | | | | |
|---|---|---|---|---|
| 3,220,766 A | * | 11/1965 | Kates | 182/116 |
| 4,331,216 A | * | 5/1982 | Amacker | 182/135 |
| 4,428,456 A | * | 1/1984 | Rohde | 182/20 |
| 5,009,283 A | * | 4/1991 | Prejean | 182/116 |
| 5,195,611 A | * | 3/1993 | Untz | 182/187 |
| 5,409,081 A | * | 4/1995 | Reeves | 182/116 |
| 5,927,435 A | * | 7/1999 | Benton | 182/116 |
| 6,035,968 A | * | 3/2000 | Morales | 182/116 |
| 6,267,202 B1 | * | 7/2001 | Nelson | 182/187 |
| 6,550,575 B2 | * | 4/2003 | Spencer et al. | 182/127 |

OTHER PUBLICATIONS

Robb, Bob, "What's New in Tripod Stands", Guns & Gear, [retrieved on Nov. 26, 2002]. Retrieved from the Internet <URL:http://www.gunsandgear.com/Gear%20Guide/Archive.stands.htm>.
All Seasons Feeders [retrieved on Nov. 26, 2002]. Retrieved from the Internet <URL:http://www.allseasonsfeeders.com/category.asp?cat=tss>.
Blackwater Creek Treestands (BCT 122) [retrieved on Nov. 26, 2002]. Retrieved from the Internet <URL:http://www.blackwatercreek.com/product122.asp>.
Blackwater Creek Treestands (BCT 117/114) [retrieved on Nov. 26, 2002]. Retrieved from the Internet <URL:http://www.blackwatercreek.com/product1147.asp>.
Blackwater Creek Treestands (Canopies) [retrieved on Nov. 26, 2002]. Retrieved from the Internet <URL: http://www.blackwatercreek.com/accessories_canopies.asp>.
Bass Pro Shops Ladder Treestands (Ol' Man Ol' Timer Partner Ladder) [retrieved on Nov. 26, 2002]. Retrieved from the Internet <URL:http://www.basspro-shops.com>.
Bass Pro Shops Ladder Treestands (Gametamers Tree Ladder) [retrieved on Nov. 26, 2002]. Retrieved from the Internet <URL:http://www.basspro-shops.com>.
Bass Pro Shops Ladder Treestands (American Hunter 2 Person 10' Tower) [retrieved on Nov. 26, 2002]. Retrieved from the Internet <URL:http://www.basspro-shops.com>.
Bear River Tripod [retrieved on Nov. 26, 2002]. Retrieved from the Internet <URL:http://www.bearrivertreestands.com/tripod.html>.
Bear River Padded Arm Rest [retrieved on Nov. 26, 2002]. Retrieved Internet <URL:http://www.bearrivertreestands.com/armrest.html>.

(Continued)

Primary Examiner—Hugh B. Thompson, II
(74) Attorney, Agent, or Firm—Kevin Gust (57) ABSTRACT An elevated platform configurable for use in cooperation with a tree or pole, or as a free-standing unit. A triangular assembled configuration provides maximum safety and rigidity with a minimum complexity and weight. Interchangeable components, universal connectors, and tool-free assembly result in ease and speed for assembly and disassembly. The platform is adaptable for use in any number of configurations and is transformable into a trailer for towing by a person, ATV, or vehicle. Additionally, a gun/camera rail, bow rack, weather resistant shelter, and a swivel seat provide improved comfort for extended use.

13 Claims, 10 Drawing Sheets

OTHER PUBLICATIONS

Buck Fever's Hunting Stands (Quik Stik) [retrieved on Nov. 26, 2002]. Retrieved from the Internet <URL:http://www.buckfevermfg.com/huntingstands3.htm>.

Cabela's 14' Tripod Kit [retrieved on Nov. 26, 2002]. Retrieved from the Internet <URL:http://www.cabelas.com>.

Cabela's 16' Tripod Kit [retrieved on Nov. 26, 2002]. Retrieved from the Internet <URL:http://www.cabelas.com>.

Cabela's Tripod Blind [retrieved on Nov. 26, 2002]. Retrieved from the Internet <URL:http://www.cabelas.com>.

Pro Bigfoot—Tree Stand [retrieved on Nov. 26, 2002]. Retrieved from the Internet <URL:http://www.prohuntproducts.com/bigfoot2.htm>.

Pro Eagle Tower—Tree Stand [retrieved on Nov. 26, 2002]. Retrieved from the Internet <URL:http://www.prohuntproducts.com/eagle2.htm>.

Sureshot Premium Shooting Rest [retrieved on Nov. 26, 2002]. Retrieved from the Internet <URL:http://www.prohuntproducts.com/sureshot.htm>.

Renegade Hunting Products [retrieved on Nov. 26, 2002]. Retrieved from the Internet <URL:http://www.renegadestands.com/products.html>.

Warren & Sweet—Ambassador Tripod [retrieved on Nov. 26, 2002]. Retrieved from the Internet <URL:http://www.warrenandsweat.com/ambassador.html>.

* cited by examiner

PORTABLE ELEVATED PLATFORM

BACKGROUND OF THE INVENTION

1. Field of the Invention

The present invention relates generally to the field of portable structures. More particularly, it concerns a system and method for an apparatus that is that is easy to move and transport as a cart, easy to selectively assemble as either a free-standing elevated platform or as a supported elevated platform for use with an upright, and adjustable to different heights.

2. Description of Related Art

Elevated stands have been in use for several years by hunters, photographers, and nature lovers as a way to observe wildlife with minimal intrusion into the environment. U.S. Pat. Nos. 5,624,008, 5,105,908, 5,590,738, 5,064,020, 5,295,555, 5,564,523, and 6,347,684 all describe devices or systems that enable a person to observe from a some distance above the ground. However, these and other prior art systems have significant disadvantages with regards to safety, complexity, accessibility, and adaptability.

In some situations, it is advantageous for the observer to take advantage of existing uprights, such as trees or poles, to provide support or concealment. U.S. Pat. Nos. 5,624,008, 5,590,738, 5,105,908, and 5,064,020 all describe elevated stands designed for use with a tree, utility pole, or other upright. U.S. Pat. No. 5,492,196 generally discloses a portable deer cart and tree stand, in which the tree stand can be used to sit in an elevated position abutting a tree or pole and can further be transformed into a deer cart for a person to pull. U.S. Pat. No. 5,624,008 generally describes a convertible tree stand in which the user can use the stand to climb a tree to a desired location, and the stand is transformable into a cart for carrying equipment and the like. U.S. Pat. No. 5,105,909 generally describes a ladder treestand and trailer rit in which a user climbs a ladder to sit in a platform in a tree, and the assembly can be configured for transportation. U.S. Pat. No. 5,064,020 generally describes a device for hunting large and small game in which a user climbs a ladder to sit on a platform in a tree, and the assembly is convertible into a transportation configuration. Elevated platforms similar to these inventions all have limitations and shortcomings. A limitation is the need for a tree or pole. The '008 and '196 patents further do not provide safe means to ascend from the ground to the platform. It can be hazardous to climb up a tree using pegs or spikes driven into the tree, because a boot that is slick from mud or rain might slide off the end of the peg, resulting in a fall from some height, possibly resulting in an injured person in a remote area. The seating arrangement for these and similar patents is also undesirable. People who are nervous about heights may not enjoy sitting on a platform that has minimal space. The seat is also very close to the tree and cannot rotate. This is disadvantageous in hunting situations. If a deer approaches the tree from behind, the hunter might not realize the deer is there, may spook the deer while moving into a better position, is forced to rotate about the torso if aiming a gun at the deer, and might not be able to shoot at the deer if the deer is approaching from an angle such that the tree interferes with the hunter's shooting position. Climbing stands similar to the climbing stand described in the '008 patent are limited in use due to the reliance on a straight, tall tree having a diameter within a specific range, and generally free of branches, and would not work well with trees that are short, have branches low to the ground, are bent, or have a diameter that is too small or too large for the climbing stand. It is therefore desirable to provide an elevated platform that does not require a straight tree or pole or other upright, or a tree absent branches below the desired elevated platform height. The elevated platforms described in the '908 and '020 patents disclose a ladder, which might provide some safety over pegs in the tree. However, these inventions and other similar inventions are still limited to use with a tree, and the seating arrangement is similar to the seating arrangement for the climbing tree stands.

In some situations, it is advantageous for the observer to utilize a free-standing elevated platform. U.S. Pat. Nos. 6,347,684, 5,564,523, 5,295,555, and 5,327,993 all describe elevated stands designed for use as free-standing units. The '993 patent generally describes a deer stand apparatus having an elevated platform and a support structure, and adapted for disassembly for transporting or storing. The '684 patent generally describes a mobile hunter's stand having a wheeled mobile carriage and a platform assembly that is erected by pushing on the tongue of the wheeled mobile carriage. The '523 patent generally describes a portable deer stand having a trailer, base and stand structure. The '555 patent generally describes a hydraulic deer stand having a wheeled trailer chassis and a platform erected using hydraulic pressure. All of these inventions and other similar inventions are limited to use in open areas and cannot be used with a tree or other upright. The hunter ascends to the platform on a ladder more similar to pegs than a ladder, and inherently susceptible to having a foot slip. The '684, '523, and '555 patents may be mobile, but not easily pulled by a single person. The '555 patent further requires hydraulic fluids. Also, elevated platforms similar to these are described with large square platforms, which create blind spots for hunters.

Another important concern for hunters, especially bow hunters, is the location of the elevated platform. For example, bow hunters generally require a more exact shooting lane. However, prior art elevated stands are generally limited to either supported stands for use with an upright, or free-standing units, or the stand is not portable enough for a hunter to move it even a few feet. Using prior art platforms, an observer, whether a hunter, photographer, or a nature lover, is limited in where the elevated platform is located.

It is therefore desirable to provide an elevated platform that is adapted to different settings, such that it does not require a tree or require a large open space.

It is further desirable to provide an elevated platform that may be pulled or moved by a single person on foot.

It is further desirable to provide an elevated platform that an observer may ascend or descend without fear of a foot slipping.

It is further desirable to provide an elevated platform that provides a large field of vision free from blind spots.

It is further desirable to provide an elevated platform that is easily assembled or disassembled. It is further desirable to provide an elevated that may be easily configured to work well in a particular situation or setting It is further desirable to provide an elevated platform that permits movement of the observer without fear of falling from the platform.

It is further desirable to provide an elevated platform that is comfortable for the observer.

It is further desirable to provide an elevated platform that is easily converted from one configuration to another.

SUMMARY OF THE INVENTION

The present invention overcomes the shortcomings of the prior art elevated platforms with an apparatus that is adapted for use as a free-standing unit, as a supported stand, and as a sled or cart. The apparatus is constructed and configured such that a single person may manually pull or move the apparatus without the aid of an ATV or other vehicle. However, the present invention also comprises adaptations to permit towing by a vehicle or ATV. The present invention has adaptations to permit an observer to ascend or descend the platform in a safe manner without fear of slipping. The present invention has adaptations to permit an observer to sit such that rotation is accomplished by swiveling on a seat. The present invention is further adapted to minimize blind spots.

In one broad respect, the present invention is directed to a selectively convertible apparatus that is capable of being converted into free-standing elevated platform configurations, supported elevated platform configurations, and transportable cart configurations. The apparatus generally comprises a platform adapted for contact with an upright, and having a generally central aperture and three platform connectors, wherein one of the platform connectors is adapted for pivoting about an axis; three legs, wherein each of the legs has one or more sections is adapted for detachable connection to each of the platform connectors in a generally triangular configuration, and wherein at least one of the legs is adapted for use as a ladder; a support structure adapted for connection to the legs and capable of rigidly interconnecting the legs in the triangular configuration to form a structurally stable free-standing elevated platform, and capable of connecting the platform to an upright and rigidly interconnecting the legs with the upright to form a structurally stable supported elevated platform; an axle adapted for connection to the platform, and further adapted for detachable connection to the sections and the support structure; and wheels such that the apparatus is further operable as a cart. In a narrow respect, the support structure comprises three braces adapted for detachable connection between two legs, and further adapted for detachable connection to an upright. In another narrow respect, the support structure comprises adjustable length braces adapted for connection to at least one section; a central hub with a generally central aperture, wherein the adjustable length braces are rotatably connected to said central hub; lengths of cable, wherein each length of cable is adapted for detachable connection to at least two legs and further adapted for detachable connection to an upright; and an adjustable tension stop operable to maintain the adjustable length braces in a selected configuration. In another narrow respect, the present invention further comprises a seat having a seat post, wherein the generally central aperture in the platform is adapted for detachable connection to the seat post on the top side of the platform, and wherein the seat post is operable to rotate 360 degrees about the seat post axis of rotation. In a narrower respect, the present invention comprises an accessory support adapted for detachable connection to said seat post. In another narrower respect, the present invention comprises a bow rest adapted for detachable connection to said seat post. In another narrower respect, the present invention comprises a weather resistant shelter adapted for detachable connection to said seat post. In another narrow respect, the generally central aperture is further adapted for detachable connection to hardware on the underside of the platform In another narrower respect, the hardware comprises an eye bolt. In another narrow respect, at least one of the three legs adapted for use as a ladder comprises closed loop rungs adapted for use in rain, mud, snow, and ice conditions. In another narrower respect, the axle is adapted for detachable connection to said platform In another narrower respect, the wheels are adapted for detachable connection to said axle. In another narrow respect, the cart configuration further comprises a tow hitch adapted to tow behind a vehicle.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
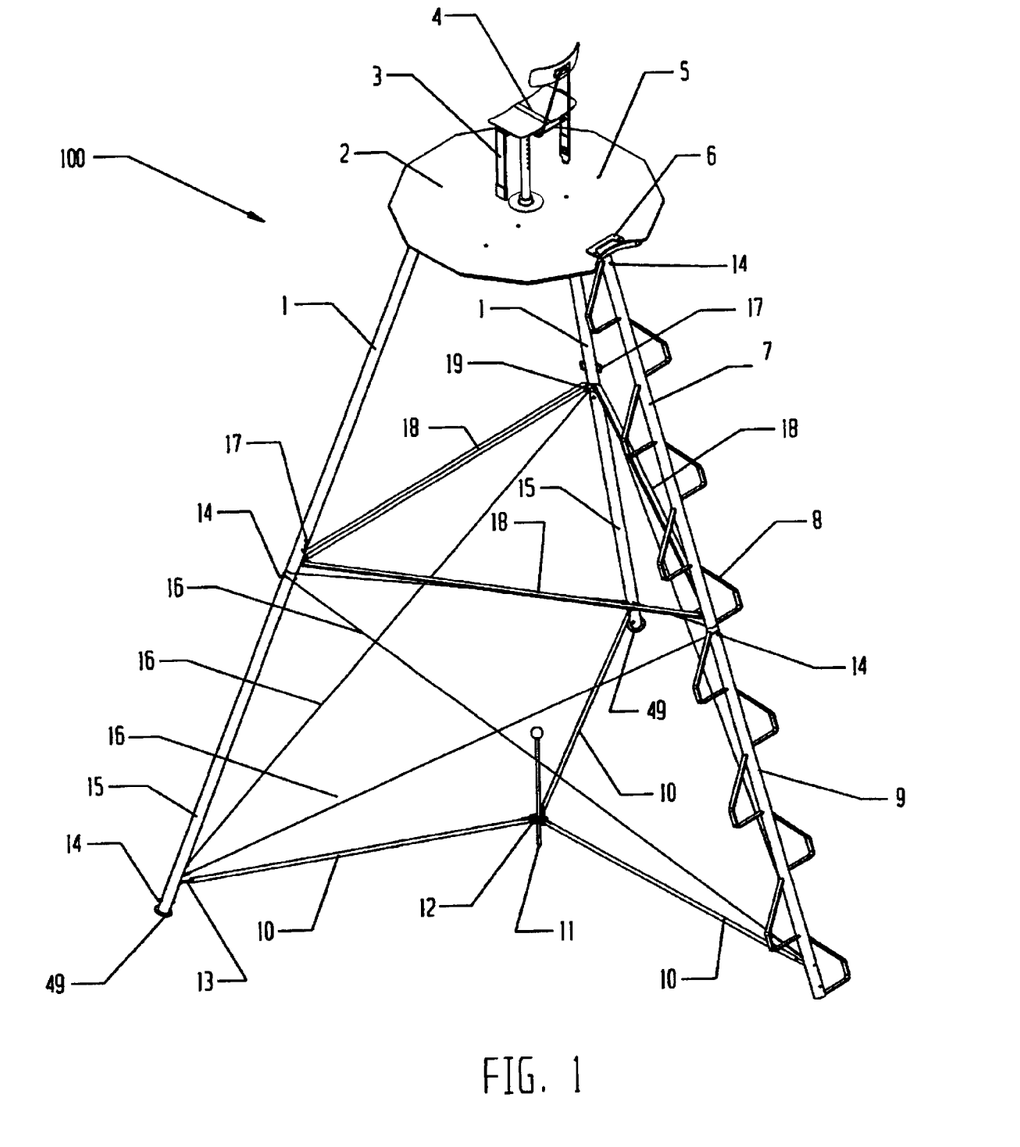
FIG. 1 is a simple perspective of a free-standing configuration according to one embodiment of the present invention.
Figure 2:
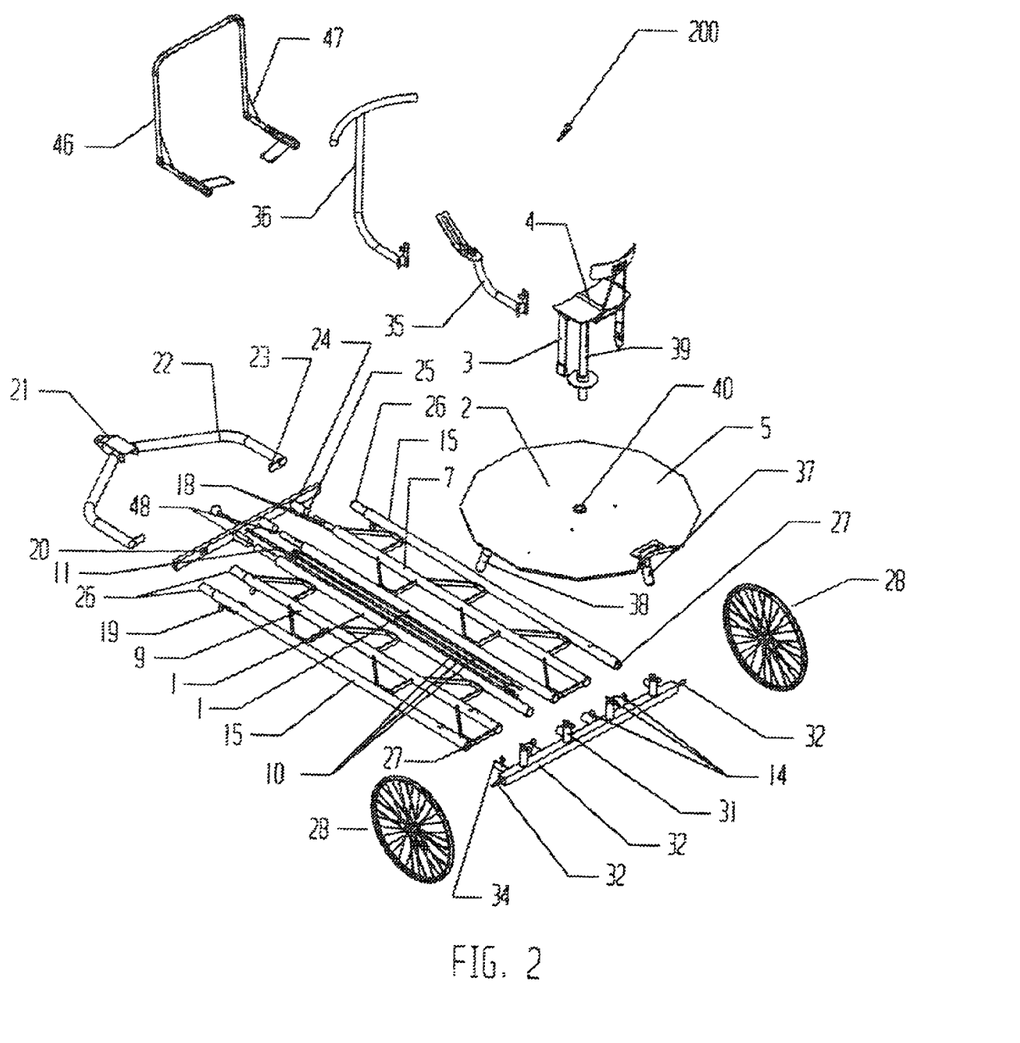
FIG. 2 is an exploded view of an embodiment of the present invention in a transportable configuration.
Figure 7:
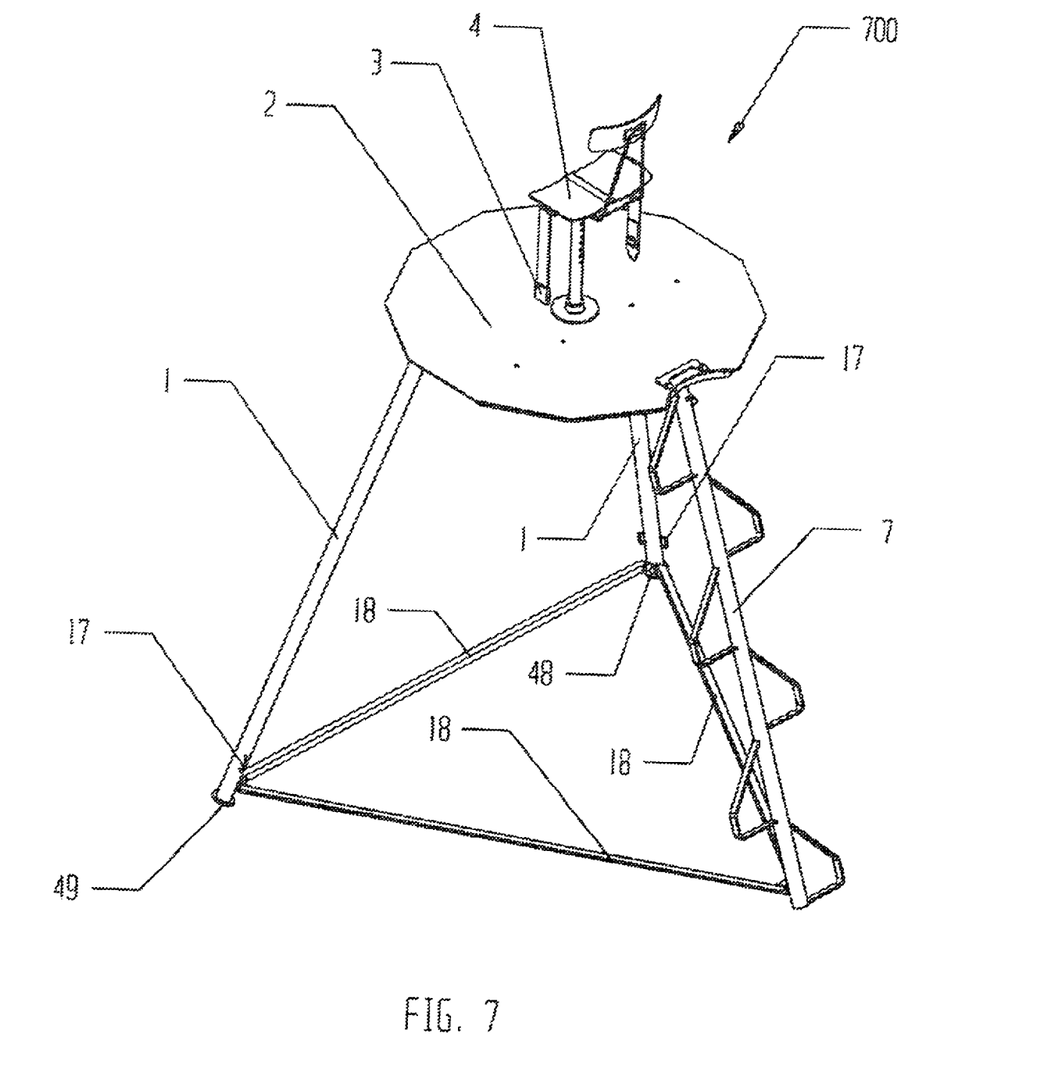
FIG. 7 is a simple perspective view of one embodiment of the present invention in a simplified free-standing configuration.
Figure 8:
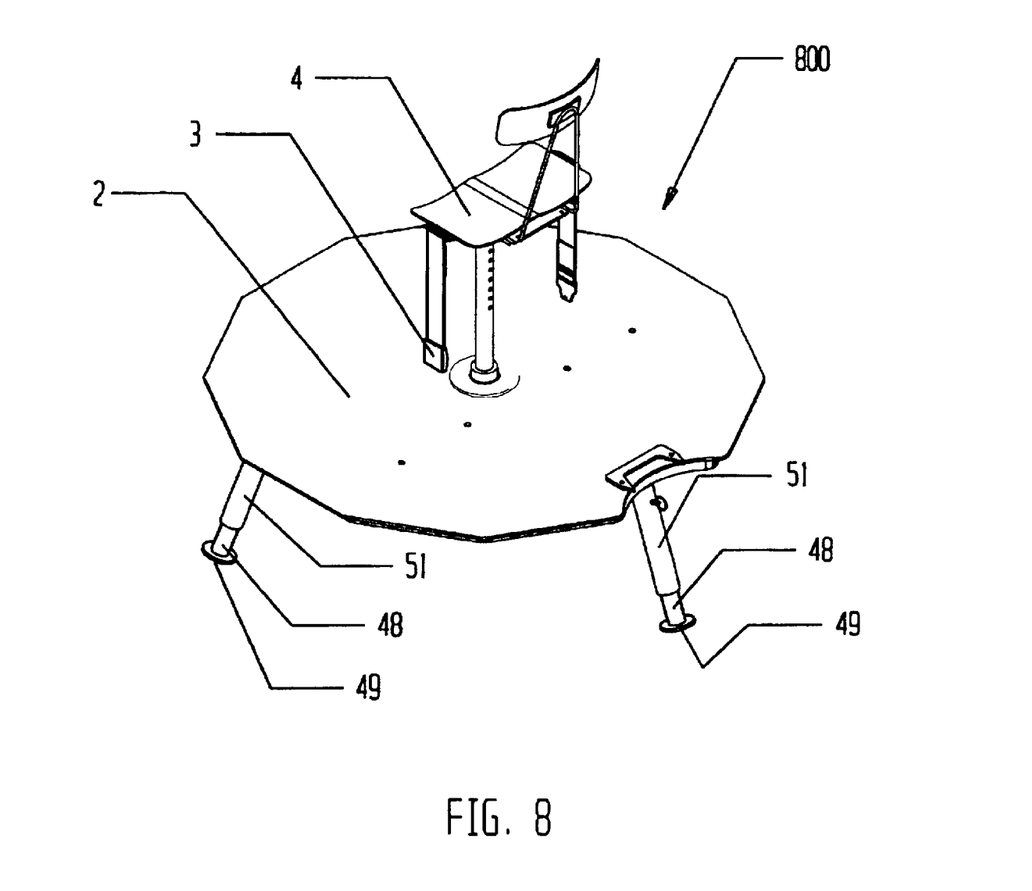
FIG. 8 is a simple perspective view of one embodiment of the present invention in a simplified free-standing configuration.

Referring to the figures, FIGS. 1, 7 and 8 are views of free-standing elevated platform configurations 100, 700, and 800 in accordance with embodiments of the present invention. The elevated platform configuration 100, 700, or 800 generally comprises a platform 2, a selected combination of legs 1, 7, 9, 15, and 51 to support the platform and may further comprise a support structure comprising braces 18, which may also be referred to as spreader bars; or a central hub support system 12 and tensile members 16, which may also be referred to as a cable lock system, or both.

Now referring to FIGS. 1, 2, 4, 5, 6, 7, 8, and 10, the platform 2 comprises three platform connectors 37 and 38 mounted on the underside of the platform 2, and a cutout portion 6 adapted to abut an upright, such as a tree or a pole. The platform 2 may be constructed of any material that provides sufficient weight-bearing capability to support an observer and equipment. In a preferred embodiment, the platform 2 is constructed of a lightweight material. The shape of the platform 2 is also designed for maximum visibility and safety for an observer. Instead of providing a small platform that allows minimal movement or a large platform that limits areas for use or reduces visibility, the present invention utilizes a platform 2 designed to improve visibility. The platform 2 gives an observer more sure footing for moving and shifting on the elevated platform. The more circular design reduces blind spots normally associated with the square corners of prior art systems. Although the design is generally circular, an essentially circular design is not required. In a preferred embodiment, the platform 2 is a 12-sided figure, which has fewer blind areas than a 4-sided design and may be easier to manufacture than a circular design. However, those of skill in the art will appreciate that any shape platform 2 may be used such that blind areas are reduced or eliminated and the observer has a greater sense of safety.

The platform 2 is further adapted to receive and secure a seat 4, and may therefore include an aperture 40, a shaft (not shown) for insertion into a corresponding sleeve on the seat shaft, or a sleeve (not shown) for receiving a seat shaft, or any combination. It will be apparent to those of skill in the art that the platform 2 may further include any mechanism for securely receiving a seat 4 without departing in scope from the present invention.

Additionally, the platform 2 may be adapted to support other hardware for use with the elevated platform. In the preferred embodiment, the platform adaptation 49 comprises a shaft in the generally central aperture 40, the shaft being adapted to accommodate a seat post for use on the topside of the platform 2, and has a feature or adaptation 49 available to the underside of the platform 2. Using this embodiment, hardware may then be detachably connected to the platform 2 from underneath the platform 2 for other uses. For example, an eyebolt (not shown) may be threaded into a generally central threaded aperture 49 from underneath; a block and tackle may be attached to the eyebolt; and a deer may be suspended from the block and tackle. Other hardware such as a hoist or winch may be detachably connected to the adaptation on the underside of the platform 49 without departing from the scope of the present invention.

Figures 4A, 4B:
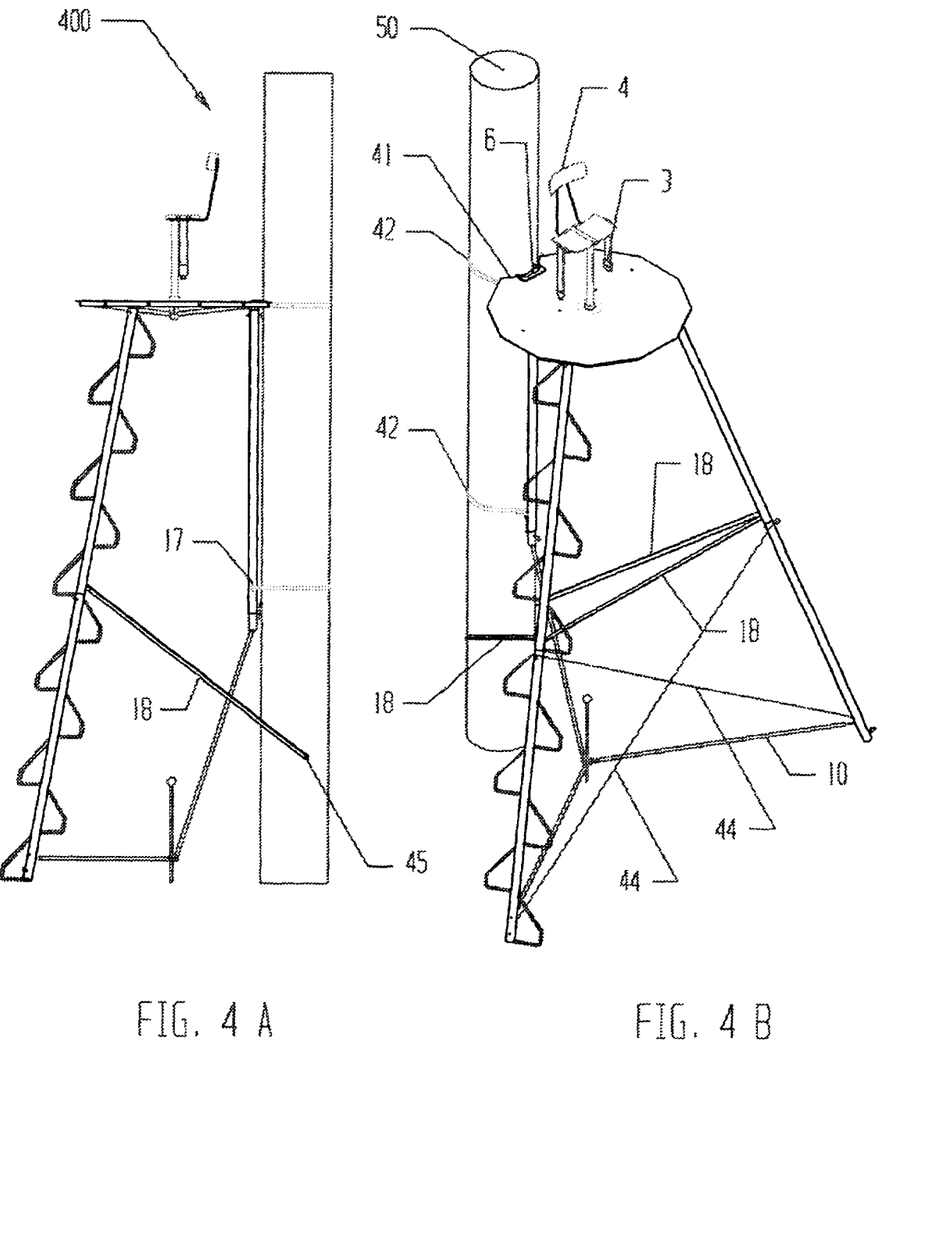
FIGS. 4A and 4B are elevation and simple perspective views of a supported stand configuration in accordance with one embodiment of the present invention.

The cutout portion 6 of the platform 2 is adapted to facilitate attaching the platform 2 to a tree, pole or another upright, as shown in FIG. 4. Additionally, in some embodiments the cutout portion 6 comprises one or more mechanical adaptations such as barbs or spikes that provide additional safety to supported elevated platform configurations by gripping the upright.

The three platform connectors 37 and 38 are universally adapted for secure detachable connection to one end of any of the legs 1, 7, 9, and 15. The platform connectors 37 and 38 may utilize any means to accommodate a secure, yet detachable, connection between the legs 1, 7, 9, 15, and 51 and the platform 2. Each platform connector 37 and 38 may be, for example, a male-type connector adapted for insertion into one end of a leg, or a female-type connector for receiving one end of a leg. In a preferred embodiment, apertures in the legs 1, 7, 9, 15, and 51 and in the platform connectors 37 and 38 are aligned so that quick-disconnect pins, cotter pins, or any other type of connector 14 that requires no tools for connection, may be inserted to securely connect the legs to the platform connectors, yet still allow a person to detach the legs 1, 7, 9, 15, and 51 from the platform connectors 37 and 38. However, it will be apparent to those skilled in the art that any mechanical fastener or mechanism that securely connects the legs 1, 7, 9, 15, and 51 to the platform connectors 37 and 38 may be used within the scope of the present invention. For example, lynch pins or self-locking bolts may be substituted for quick-disconnect pins, or the ends of legs 1, 7, 9, 15, and 51 may have threads to screw directly into the platform connectors 37 and 38. Platform connector 37 does not provide a rigid attachment point, and instead permits rotation or pivoting of a section about an axis. As discussed below, this pivoting platform connector 37 allows for easier assembly and disassembly of the elevated platform, as well as permits the use of the elevated platform in other configurations. Each of the legs 1, 7, 9, and 15 is adapted to detachably connect to any of the three platform connectors 37 and 38 and further adapted for use with the support structure (discussed below).

Figure 3:
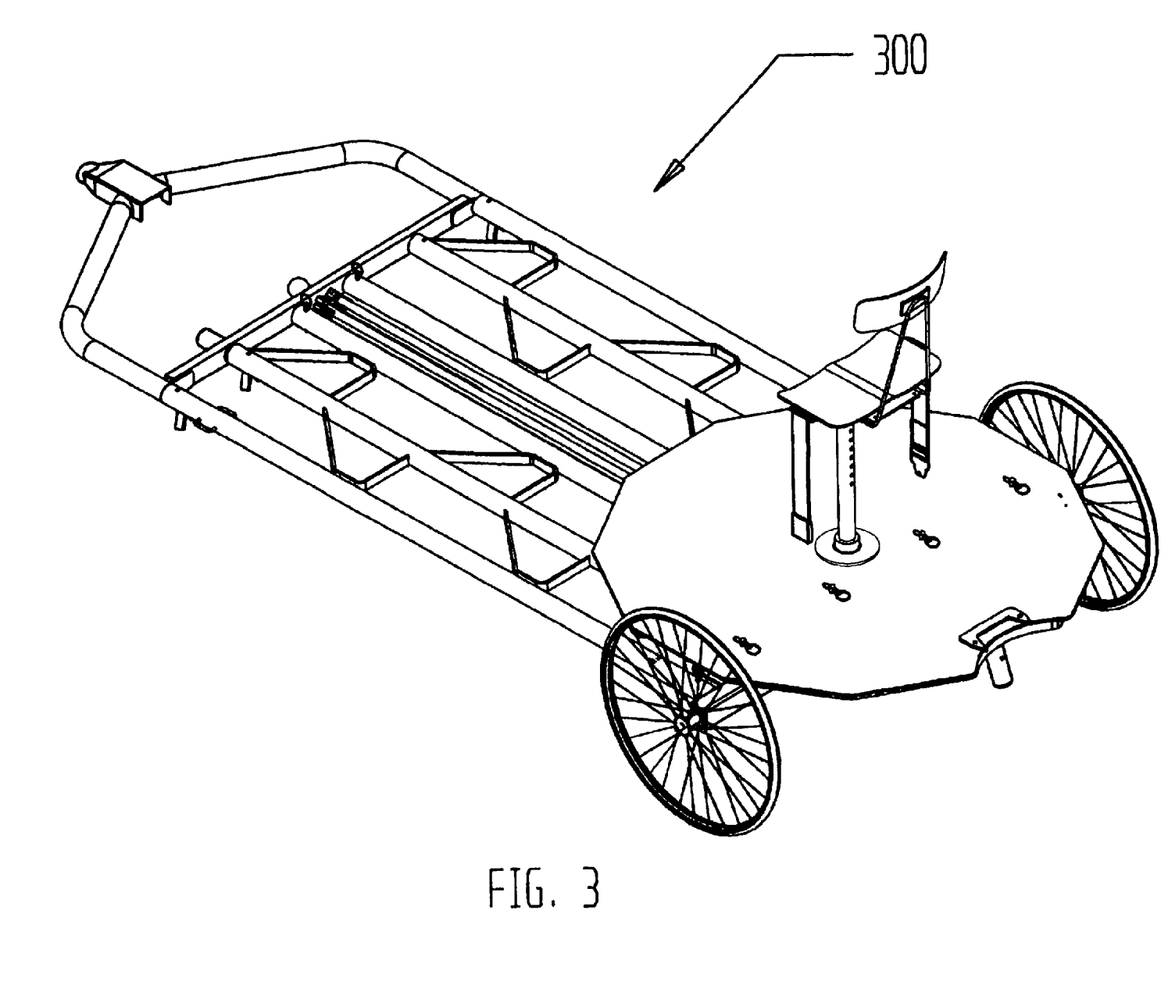
FIG. 3 is a simple perspective view of a transportable cart configuration in accordance with one embodiment of the present invention.

Legs 1, 7, 9, 15, and 51 are adapted for secure connections such that accidental detachment is impossible. In preferred embodiments, legs 1, 7, 9, 15, and 51 have apertures aligned such that a mechanical fastener 14 may be inserted to securely lock legs 1, 7, 9, 15, and 51 together. In one preferred embodiment, a quick-disconnect pin securely locks connected sections together. Legs 1 and 7 are of essentially the same length to ensure a level, stable platform 2, and legs 9 and 15 are of a same length for the same reason. Legs 1, 7, 9, 15, and 51 need not be the same length In some embodiments, having legs of different lengths gives an observer more versatility in selecting the desired height of the platform 2. Legs 1 and 7 are interchangeable, and legs 9 and 15 may also be interchangeable, such that a leg 9 or 15 may be connected with a leg 1 or 7 with no noticeable difference in the stability of the platform 2. Legs 1, 7, 9, 15, and 51 may be manufactured from any material that provides the strength to support the platform 2. In preferred embodiments, legs 1, 7, 9, 15, and 51 are manufactured from a lightweight material such that the present invention is easier to pull, tow, assemble, disassemble, lift, carry, or stow. In one preferred embodiment, legs 1, 7, 9, 15, and 51 are manufactured from lightweight aluminum tubing, which provides high strength to support the platform 2, low weight, and advantageously provides storage space for components during transportation, discussed below with respect to FIGS. 2 and 3.

The present invention is adapted for use on uneven terrain. To accomplish this objective, leg extensions 46 are utilized to stabilize the elevated platform. Each leg extension 46 is adapted for connection to any leg 1, 7, 9, 15, and 51. In some embodiments, only two leg extensions 46 are utilized because at most two legs may need adjustment to level the platform. Each leg extension 46 is constructed of a material that will provide the necessary strength to support at least a portion of the elevated platform, and further contains a sufficient number of apertures for proper alignment to keep the platform 2 level. In preferred embodiments, only half of each leg extension 46 has apertures, for ease of manufacturing. In these embodiments, if the leg extension 46 needs to be extended only a small amount, the half with holes protrudes from the leg 1, 7, 9, 15, and 51, or from platform connector 37 or 38. If, on the other hand, a considerable amount of the leg extension 48 is needed to level the elevated platform, the half of the leg extension 48 that has apertures may be inserted into the leg 1, 7, 9, 15, and 51, or platform connector 37 or 38. Advantageously, by using this technique, manufacturing costs are reduced but functionality is unaffected. To assist with leveling the platform 2 without climbing to the platform 2, some embodiments of the present invention use levels to indicate the levelness of the platform 2. In a preferred embodiment, spirit levels are affixed to the braces 18 to assist in the leveling process. The present invention may also comprise feet 49 that may be connected to any leg 1, 7, 9, 15, and 51, or platform connector 37 or 38 to prevent the elevated platform from slipping or sinking into the ground.

In addition to supporting platform 2, legs 9 and 15 are adapted to provide an observer with a safe means to ascend to and descend from the platform 2. As discussed above, each leg 1, 7, 9 and 15 is adapted for connection to the platform connectors 37 and 38, so each ladder leg 9 and 15 is adapted to connect with each platform connector 37 and 38. This feature is advantageous by permitting the observer to select which leg is the preferred leg to ascend. For example, a hunter may want to position the elevated platform and ladder leg 9 or 15 such that the hunter is always facing a shooting lane when using the ladder.

The rungs 8 may be manufactured from any material that will support the weight of an observer. In the preferred embodiment, the rungs 8 are manufactured from aluminum that is welded to the section. Each rung 8 is large enough to accommodate an observer's foot, which may be, for example, in a large boot inside a large overshoe and covered with mud. Ideally, the rung 8 is small enough to prevent significant side-to-side movement of the foot, and furthermore, the possibility of the foot slipping off the end of the rung, as in the case of pegs in a tree, is eliminated. In a preferred embodiment as shown in FIG. 1, the ladder rungs 8 are of a closed loop construction, which accommodates an observer's foot in a safe manner. In one preferred embodiment, the rungs 8 are constructed of a material having a rectangular cross-section with distinct edges. Using this construction on a ladder that is positioned at an angle results in a rung 8 that resists a foot slipping either forward or backward, thereby contributing to the overall safety of the portable elevated platform.

In some situations, the legs 1, 7, 9, 15, and 51 may be unnecessary or undesirable. For example, duck hunters may want a platform close to the ground. In this situation, although a support structure would still provide rigidity to the overall construction, the duck hunter may not notice the difference in hunting success between a fully assembled elevated platform and a partially assembled elevated platform, and might not take the time to fully assemble the support structure. However, as the desired height increases, or the number of legs increases, or as the terrain becomes more uneven, support becomes more desirable and eventually necessary. FIGS. 1, 4, and 7 depict two systems operable to provide rigid support for the platform.

A first support system similar to the one shown in FIG. 1 generally comprises braces 18 for connecting any two legs 1, 7, 9, and 15. Each brace 18 is adapted to accommodate connection between any two legs 1, 7, 9, and 15 such that movement is minimal. A configuration in which the legs 1, 7, 9 or 15 are connected to the platform connectors 37 and 38 on the upper end and have braces 18 connecting to other legs 1, 7, 9 or 15 at the lower ends provides a rigid overall construction. The braces 18 may be manufactured from any material that provides high compressive strength, and may have any geometry that provides high strength, including torsional and lateral strength. In a preferred embodiment, selecting legs 1, 7, 9, and 15 of appropriate length and inner diameter and further selecting braces 18 of a proportional length permits braces to be stored inside the legs 1, 7, 9, and 15 when not in use, discussed below in greater detail. In other embodiments, the braces may be rotatably affixed to a leg 1, 7, 9 or 15. The use of braces 18 provides a very rigid overall construction to support the elevated platform. However, as more legs (not shown) are added or the overall length of the legs 1, 7, 9, and 15 increases, other support structures may be utilized to support the legs 1, 7, 9, and 15.

In a second support system similar to the one shown in FIG. 1, legs 1, 7, 9, and 15 are stabilized and supported by a centralized brace system, comprising adjustable length braces 10 connected to a central hub 12 and an adjustable tension stop 11, in combination with a cable system, comprising tensile members 16. Each adjustable length brace 10 comprises a rigid portion coupled to an adjustable portion 13. Although any adjustable portion 13 may be used, in a preferred embodiment, the adjustable length brace 10 comprises a turnbuckle assembly such that no tools are necessary to adjust the length, and, once adjusted, the length remains essentially fixed. Each adjustable length brace 10 is adapted to attach to a leg 1, 7, 9 or 15 at an attachment point. The adjustable length brace 10 is then capable of rotating about the attachment point, but translation through the attachment point is prevented, thereby creating a rigid overall construction.

Each cable 16 is generally comprised of a length of cable, wire, wire rope, or any other material that provides a high tensile strength, resistance to wear and friction, and is generally adapted for outdoor use; and hardware adapted for attaching to an attachment point to a leg 1, 7, 9 or 15.

All adjustable length braces 10 connect to the hub 12 at attachment points that permit rotation by the adjustable length brace 10 about the attachment point but prevent translation by the adjustable length braces 10 with respect to the attachment points. In the preferred embodiment, once the adjustable length braces 10 are attached to the legs 1, 7, 9, and 15, the hub 12 may be depressed to force the legs 1, 7, 9, and 15 outward until the cables 16 are taut, thereby creating a very rigid overall construction. Once the cables 16 are taut, a locking pin 11 inserted through an aperture in the hub 12, essentially locks the hub 12, ensuring a secure, rigid elevated platform. In a preferred embodiment, the adjustable tension stop 11 is a locking pin operable to engage the ground to prevent movement. One advantage to the use of a central hub 12 with adjustable length braces 10 is the reduction in size of the bracing system It will be apparent to those skilled in the art that a bracing system utilizing a central hub 12 connected to adjustable length braces 10 in a configuration that enables collapsing or folding the braces 10 for storage will result in a shorter overall length, thereby enabling the bracing system to be stored inside legs 1, 7, 9, and 15, and further facilitating storage of the present invention due to smaller components.

Other advantages to the present invention will be apparent in light of the discussion and disclosure of disassembling the elevated platform into a configuration suitable for transporting, stowing, lifting, and carrying.

The present invention is capable of converting from a configuration shown in FIG. 1, 4, 7 or 8 into a configuration 300 for pulling, towing, storage, or lifting. While the following steps are explained in an order to clearly disclose the present invention, there is not a set sequence that must be followed. For example, the seat 4 may be removed at the beginning of the disassembly or at the end without affecting other steps. Furthermore, steps taken to disassemble the platform are discussed below as they apply to the configuration 100 shown in FIG. 1, and may vary according to the number of legs and the support system configuration. For example, in some embodiments, the braces 18 are detached from legs 1 and 7, while in other embodiments, the braces 18 remain attached but are rotated into a disassembled position. Furthermore, although some steps need to be completed before others for safety reasons or for convenience, the following disclosure is not intended to be the only way to disassemble the platform.

Reconfiguring the present invention from a stand 100, 400, or 700 to a cart configuration involves the removal of the bracing system or systems. In embodiments in which the bracing system comprises a central hub 12 connected to adjustable length braces 10, once the locking pin 11 is disengaged, the tension can be removed from the cables 16, permitting the adjustable length braces 10 to detach from legs 9 and 15, and the centralized brace system comprising hub 12, central pin 11, and braces 10, may be removed. The cables 10 with slack may be disconnected from legs 9 and 15. As tension is reduced in legs 9 and 15, the braces 10 may also be removed.

If the leg 1, 7, 9 or 15 that is attached to pivoting platform connector 37 is slightly raised and rotated some angle, the elevated platform can be lowered to the ground, using leg 1, 7, 9 or 15 to support the elevated platform and control the descent. Legs 1, 7, 9, and 15 can then be detached easily and safely from the platform 2.

Transformation of the elevated platform into the transportation configuration generally involves attaching legs 1, 7, 9 and 15 to forward cross member 24 and axle beam assembly 32, attaching the platform 2 or 32 or both to an axle 29 and wheels 28, and attaching a tow bar 22 and hitch 21 to front cross member 24, if needed. Forward cross member 24 and axle beam assembly 32 may also comprise adaptations for use with runners or skis (not shown) for use in snow or ice conditions.

The axle beam assembly 32 comprises a plurality of axle mounts 34 adapted to receive and securely lock the ends of legs 1, 7, 9, and 15, and vertical mounts 31 adapted with pins 31 or other adaptations to receive and securely lock the platform 2, and is further attached to two wheels 28. In preferred embodiments, the ends of legs 1, 7, 9, and 15 are attached to the axle mounts 34 using the same hardware 14 used to attach the legs 1, 7, 9, and 15 to each other, platform connectors 37 and 38, or the extensions 46. Furthermore, in preferred embodiments, legs 1, 7, 9, and 15, once connected to the axle beam assembly 32 on one end, are useable as storage compartments. In preferred embodiments, the braces 18, the locking pin 12, the cables 16, and leg extensions 46 are adapted for insertion into one or more compartments formed by the legs 1, 7, 9, and 15 and the axle horizontal mounts 34. In other embodiments, the centralized brace system may be further adapted for insertion into the compartments formed by legs 1, 7, 9, and 15 and axle horizontal mounts 34.

The ends of legs 1, 7, 9, and 15 are further adapted to connect to a forward cross member 24 and the hardware 14 used to connect legs 1, 7, 9, and 15 to each other, the platform 2, or the extensions 46 may be used to securely connect legs 1, 7, 9, and 15 to forward cross member 24. Because legs 1 and 7 may be of different length than legs 9 and 15, adaptations to forward cross member 24 may include apertures 20 to accommodate longer legs, or tenons 25 to accommodate shorter legs, or both. In the preferred embodiments, both ends of legs 1, 7, 9, and 15 are adapted to connect to either front cross member 24 or axle beam assembly 32. Additionally, a tow bar 22 or hitch 21 or both may be attached to forward cross member 24 such that a person may pull the assembly, or alternatively an ATV or other vehicle may tow the assembly.

The platform 2 is adapted for attachment to cross member 32. In a preferred embodiment shown in FIG. 2, vertical mounts 31 are adapted for insertion into apertures 5 on platform 2 using the same hardware 14 used to securely lock legs 1, 7, 9, and 15 to each other, the platform 2, or the leg extensions 46. However, other methods and devices for attaching the platform 2 to the axle beam assembly 32 are permitted without departing in scope from the present invention. Additionally, axle beam assembly 32 or axle 29 or both may be integral to the platform 2.

Referring to FIGS. 4A and 4B, the present invention is further adapted for use in cooperation with an upright, such as a tree or pole. For purposes of this discussion and disclosure, FIGS. 4A and 4B do not depict branches on either tree. However, the present invention does not require a branchless tree or pole. Furthermore, the embodiment illustrated in FIGS. 4A and 4B depict legs 1, 7, 9, and one leg 15.

As shown in FIG. 4B, the elevated platform configuration 400 has adaptations to utilize a tree or pole for support. In particular, the cutout 6 is adapted for contacting and optionally gripping the tree or pole. One advantage presented in view of FIGS. 4A and 4B is the improved range of motion allowed by the present invention. Instead of the observer being seated directly against the tree, the seat 4 is moved away from the tree, enabling a hunter to swivel 360 degrees and allowing nearly the entire range for shooting. This is a marked improvement over the prior art tree stands, in which the hunter could not swivel 360 degrees and the shooting range was limited to the flexibility in the hunter's torso.

In FIGS. 4A and 4B, a tree stand configuration 400 is shown in which the platform connector 37 is positioned closest to the tree or pole such that a leg 1 or 15 connected to platform connector 37 is angled roughly vertical, and this leg 1 or 15 is affixed to the tree using straps 42 at at least one portion to provide sufficient stability. In addition to affixing one leg 1 or 15 to the tree for support, the centralized brace assembly comprising a hub 12, central pin 11, and braces 10, or braces 18 or both may be utilized to provide additional rigidity and safety to the construction. As shown, the centralized brace system comprising hub 12, central pin 11, and braces 10, may be connected to the two extended legs 15 and the vertical leg 1, then locked in place using the locking pin 11, to provide support. The extended legs 15 may be connected to each other or to the tree or both. Attachment to the tree may be accomplished using any method. In a preferred method, T-handles or other devices that do not require tools are used to secure the ends of braces to the tree at attachment points 45.

Figure 5:
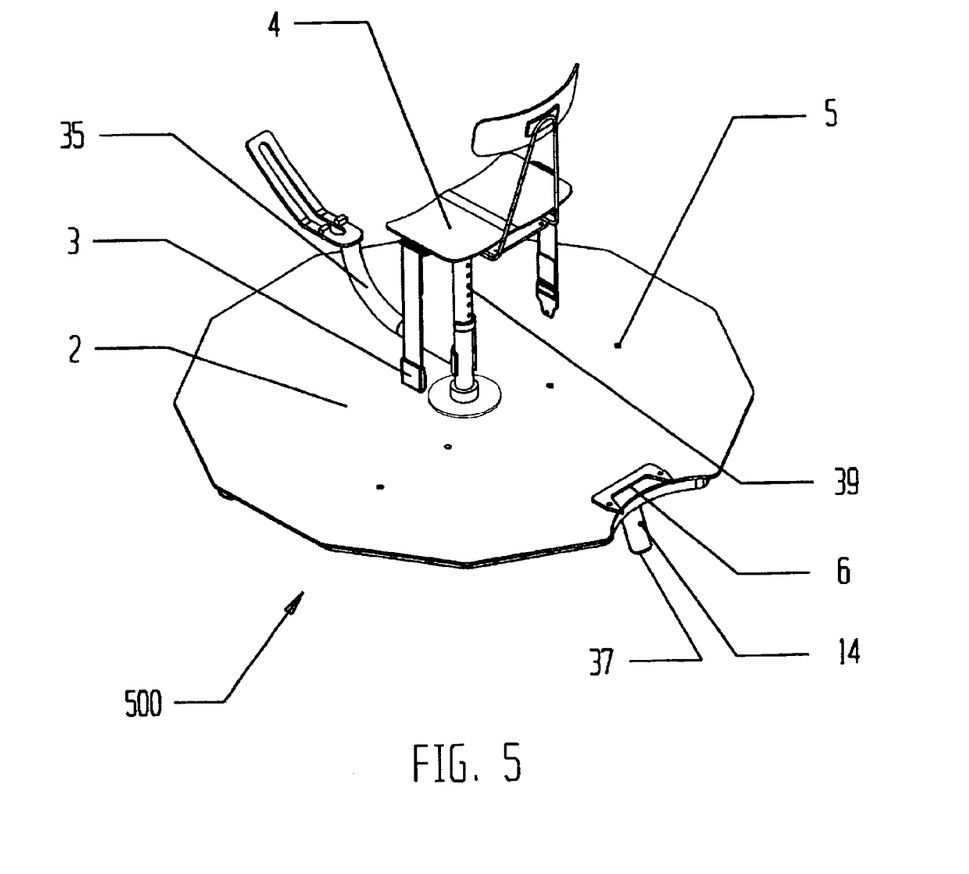
FIG. 5 is a partial view of one embodiment of the present invention utilizing a bow rack.

Referring to FIG. 5, the platform 2 and seat 4 are shown in greater detail, along with a seat belt 3, apertures 5 for facilitating attachment to an axle beam assembly during transportation or storage, and an accessory for improving the enjoyment of a bow hunter. In this embodiment, a bow rack 35 comprises an upper section adapted for supporting a bow in an upright position, a middle section adapted for use by right-handed hunters, left-handed hunters, or for use in a neutral position, and a lower section adapted for easy attachment to and detachment from the seat post.

As shown in FIG. 5, the upper section comprises an angled, slotted holder with tabs, all of which enable the rack to fully support a bow. Such a device allows the bow hunter the opportunity to rest the bow on the portable elevated platform without fear of dropping it, yet keeping the bow within reach for easy access. The upper section may be comprised of any material or materials that can adequately support a bow.

The middle section is configurable for use by right-handed hunters, left-handed hunters, or may be set to a neutral position. The selection of what position the bow is maintained in relationship to the hunter will be based on personal preferences such that the bow is convenient but does not interfere with the hunter when not in use.

The lower section is adapted to rigidly attach with the seat post. An advantage to this aspect is the hunter may rotate the seat to any angle and the bow remains in the same position with respect to the hunter and is conveniently and immediately available to the hunter at all times. When the hunter swivels in the chair, the bow rack 35 swivels with the seat post to maintain the bow in the same position relative to the hunter. Advantageously, this allows the hunter to swivel the chair to search for game and maintain any game in his/her field of vision because the bow is always in reach for easy access.

In a preferred embodiment, the seat post has a plurality of apertures 39 selectively spaced along its length, and the lower section of the bow rack has features on the front portion and on the rear portion adapted for insertion into the apertures 39. Using this embodiment, the bow rack 35 may be adjusted by lifting on the bow rack and tilting the upper portion toward the seat to disengage the attachment features. Once the attachment features are disengaged, the bow rack 35 may be removed or moved to another pair of apertures 39 to adjust the height. Although this embodiment is discussed and disclosed, any other embodiment is possible and advantageous if no tools are needed to assemble, disassemble, or adjust the vertical position of the bow rack 35, and the bow hunter is able to adjust the height while remaining seated in the seat. For example, the seat post adaptations may comprise rivets, and the bow rack 35 may have key slots. It will be apparent from this disclosure that the seat post may have adaptations 39 to receive bow rack adaptations, or the bow rack may have adaptations to receive the seat post adaptations, or both, without departing in scope from the present invention. Furthermore, the preferred embodiment design is such that the weight of a bow on the bow rack 35 provides a positive locking force to keep the attachment features in the respective holes. For purposes of this document, the attachment features may be any feature adapted for insertion into the apertures 39, such as pins or tabs.

Figure 6:
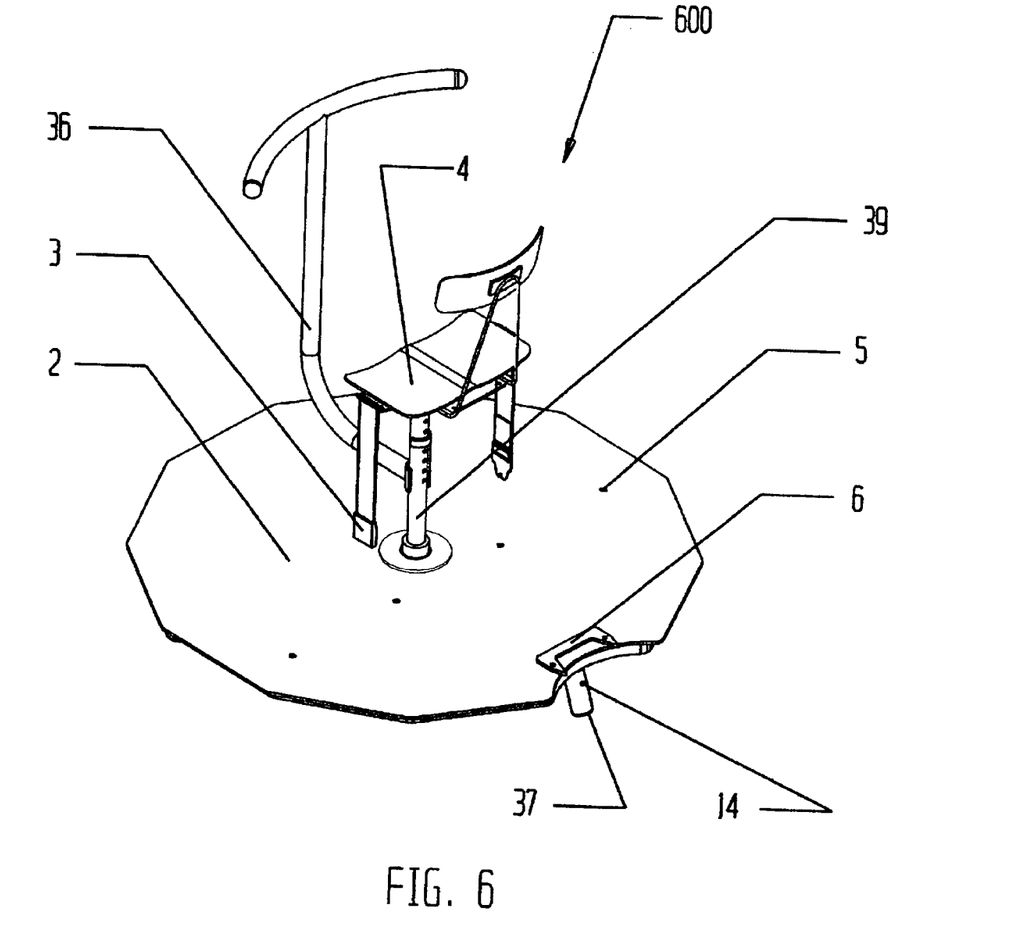
FIG. 6 is a partial view of one embodiment of the present invention utilizing an accessory support.

Referring to FIG. 6, the platform 2 and seat 4 are shown in detail, along with a seat belt 3 and an accessory for improving the enjoyment of a gun hunter, a photographer, videographer, a bird-watcher, or the like. In this embodiment, an accessory support 36 comprises an upper section for supporting a gun, still camera, video camera, binoculars or telescope, or any combination thereof; a middle section adaptable for use in a left-handed, right-handed, or neutral position; and a lower section adapted for easy installation and removal.

The upper section generally comprises a rail disposed in a position generally parallel to the surface of the platform 2 when the gun rail 36 is attached to the seat post. In some embodiments, the rail has standard mounts or mounts for attachment to a camera, video camera, binoculars, or telescope, or any combination. Further thereof it will be apparent in view of the present discussion and disclosure that additional devices may be mounted to the rail.

The middle and lower sections of the gun rail are constructed similarly to the embodiment depicted in FIG. 5. The present invention is advantageous for hunters tracking game over a wide area, photographers with heavy lenses, and the like. A gun rail 36 that is adjustable in height and maintains an observation device in a constant position or angle with respect to a person in the seat permits the observer to maintain visual contact through a large field of view without tiring due to manually supporting all the weight of the gun, camera, or the like.

In other embodiments (not shown), the present invention may comprise a weather resistant shelter adapted similarly to the gun rail 36 or the bow rack 35 so that the shelter may attach to the seat post. In these embodiments, the shelter may then rotate about the seat post axis in unison with the seat 4, similar to the actions of the gun rail 36 or the bow rack 35. Advantageously, this permits an observer to sit in a shelter with the back and sides closed for maximum protection, and maintain an opening in the front for viewing. As the observer rotates the seat, the field of vision may change, but the sides and back remain protected For purposes of this disclosure, the term "weather resistant" may refer to providing shade from the sun, protection from wind, precipitation, or temperature, or any combination.

Figure 9:
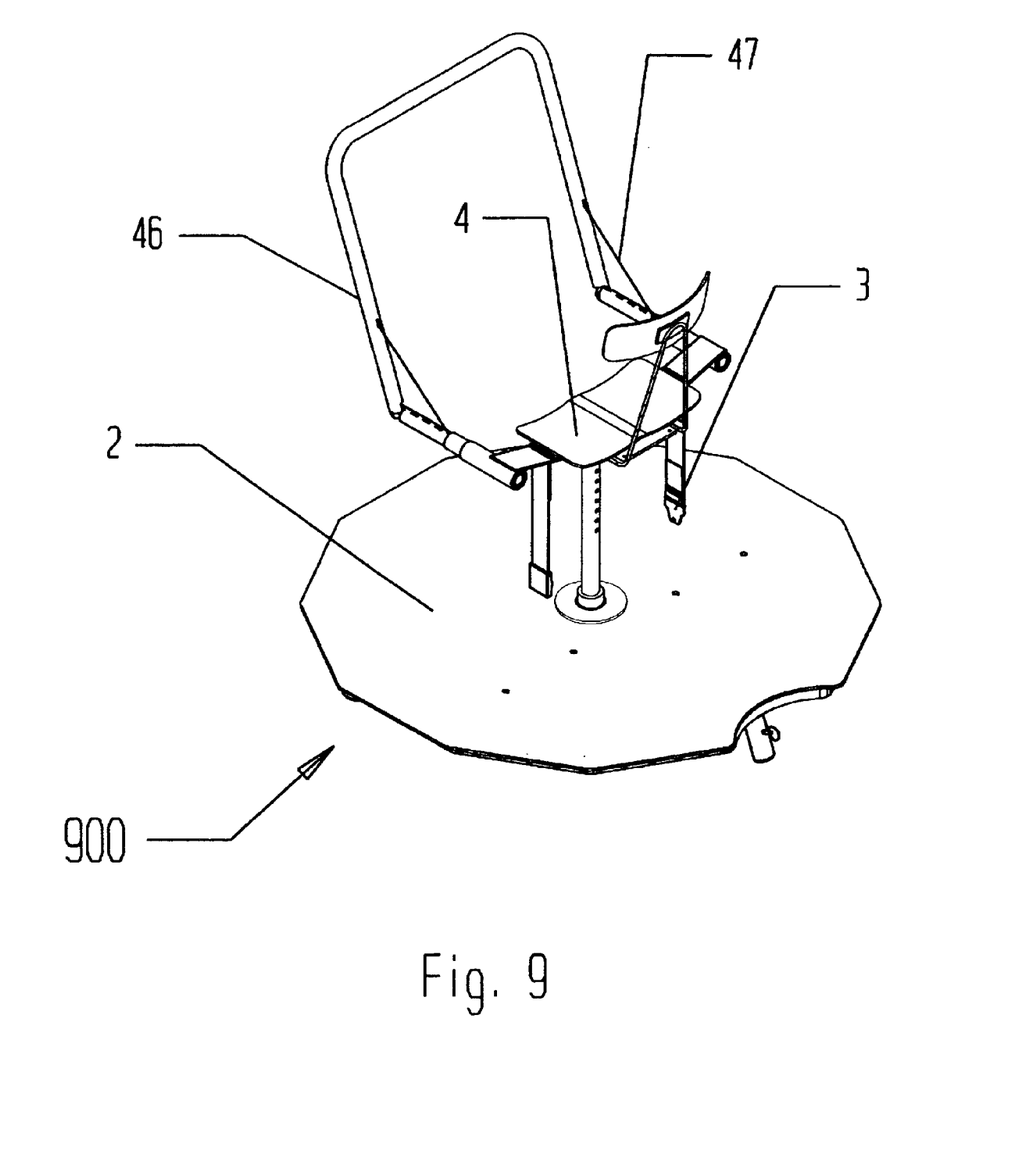
FIG. 9 is a simple perspective of an adjustable gun rest according to one embodiment of the present invention.
Figure 10:
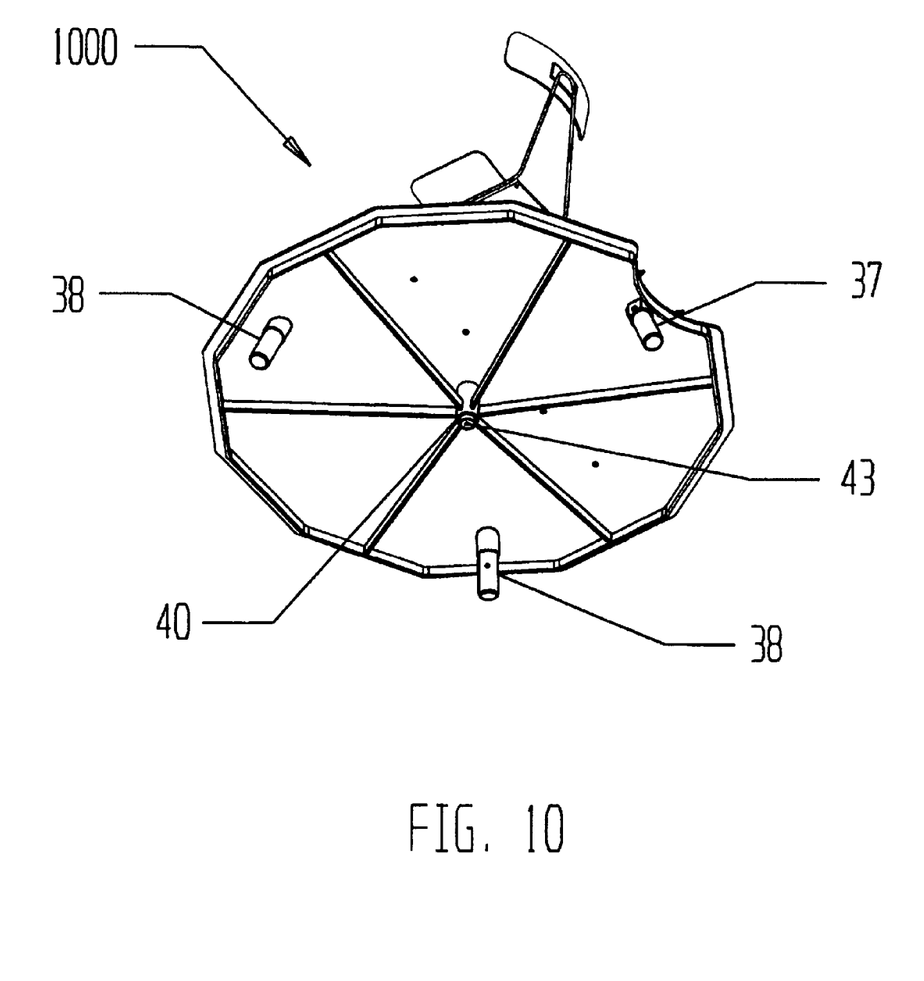
FIG. 10 is a simple perspective view of the underside of the platform portion of the elevated platform according to one embodiment of the present invention.

FIG. 9 is a simplified perspective view of an alternative to the accessory support shown and described in FIG. 6. An adjustable gun rest 46 has some similar functions as the accessory support 600 shown in FIG. 6. Additionally, adjustable gun rest 900 may be adjusted to provide a more customized feel for a user. In particular, the horizontal portions of the adjustable gun rest 46 may translate and rotate in relation to the seat 4.

The preceding examples are included to demonstrate specific embodiments of the present invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. For example, the platform may be manufactured with a grill surface so an observer can see the ground directly below the platform. Also, the gun rail 35 or bow rack 36 or both may be integral to the weather resistant shelter.

What is claimed is:

1. A selectively convertible apparatus providing free-standing elevated platform configurations, supported elevated platform configurations, and transportable cart configurations, said apparatus comprising:

a platform adapted for contact with an upright, said platform further comprising a generally central aperture and three platform connectors mounted on the underside of said platform, wherein one of said platform connectors is adapted for pivoting about an axis parallel to the plane of said platform;

three legs, wherein each of said three legs comprises at least one section, wherein each of said at least one sections is adapted for detachable connection to each of said three platform connectors in a generally triangular configuration, and wherein one of said three legs is adapted for use as a ladder;

a support structure adapted for connection to said three legs and capable of rigidly interconnecting said three legs in said generally triangular configuration to form a structurally stable free-standing elevated platform, and capable of connecting said platform to an upright and further capable of rigidly interconnecting said three legs with said upright to form a structurally stable supported elevated platform;

an axle comprising vertical mounts and horizontal mounts, wherein said vertical mounts are adapted for attachment to said platform, and wherein said horizontal mounts are adapted for attachment to said at least one sections of said three legs whereby a compartment is formed by said at least one sections and said horizontal mounts; and two wheels adapted for detachable connection to said axle such that said selectively convertible apparatus is further operable as a cart.

2. The selectively convertible apparatus of claim 1, wherein said
support structure comprises:
three braces, wherein each brace is adapted for detachable connection between two of said three legs, and further adapted for detachable connection to an upright.

3. The selectively convertible apparatus of claim 1, wherein said
support structure comprises:
a plurality of adjustable length braces, each of said plurality of adjustable length braces adapted for connection to one of said at least one sections;
a central hub comprising a generally central aperture, wherein said plurality of adjustable length braces are rotatably connected to said central hub;
a plurality of lengths of cable, wherein each of said plurality of lengths of cable is adapted for detachable connection to at least two of said three legs and further adapted for detachable connection to an upright; and
an adjustable tension stop operable to maintain the plurality of adjustable length braces in a selected configuration.

4. The selectively convertible apparatus of claim 1, further comprising:
a seat having a seat post, wherein said generally central aperture in said platform is adapted for detachable connection to said seat post on the top side of said platform, and wherein said seat post is operable to rotate 360 degrees about the seat post axis of rotation, and wherein said seat post is adapted to receive a bow rack, said bow rack comprising
a lower section adapted to attach to said seat post,
a middle section configurable for use by right-handed hunters, left-handed hunters, or a neutral position, and
an upper section adapted to receive and hold a bow.

5. The selectively convertible apparatus of claim 1, wherein said
generally central aperture is further adapted for detachable connection to hardware on the underside of said platform.

6. The selectively convertible apparatus of claim 1, wherein said
hardware comprises an eyebolt.

7. The selectively convertible apparatus of claim 1, wherein
said cart configuration comprises:
a tow bar adapted for attachment to said at least one sections of said legs; and
a ball hitch for towing behind a vehicle.

8. The selectively convertible apparatus of claim 1, further comprising:
a seat having a seat post, wherein said generally central aperture in said platform is adapted for detachable connection to said seat post on the top side of said platform, and wherein said seat post is operable to rotate 360 degrees about the seat post axis of rotation, and wherein said seat post is adapted to receive an accessory support, said accessory support comprising
a lower section adapted to attach to said seat post,
a middle section configurable for use by right-banded hunters, left-handed hunters, or a neutral position, and
an upper section adapted to support a gun.

9. The selectively convertible apparatus of claim 1, further comprising:
leg extensions adapted for detachable connection to any of said at least one sections of said three legs, wherein said leg extensions further comprise feet on one end.

10. The selectively convertible apparatus of claim 1, further comprising:
a seat having a seat post, wherein said generally central aperture in said platform is adapted for detachable connection to said seat post on the top side of said platform, and wherein said seat post is operable to rotate 360 degrees about the seat post axis of rotation, and wherein said seat post is adapted to receive an accessory support, said accessory support comprising
a lower section adapted to attach to said seat post,
a middle section configurable for use by right-banded hunters, left-handed hunters, or a neutral position, and
an upper section adapted to support optical equipment.

11. The accessory support of claim 10, wherein said optical equipment comprises a camera.

12. The accessory support of claim 10, wherein said optical equipment comprises binoculars.

13. The accessory support of claim 10, wherein said optical equipment comprises a telescope.

* * * * *